United States Patent [19]

Truby

[11] Patent Number: 5,239,666
[45] Date of Patent: Aug. 24, 1993

[54] MOBILE DETECTOR USING RSSI FOR VEHICULAR REPEATER PRIORITIZATION

[75] Inventor: Brian K. Truby, Watauga, Tex.
[73] Assignee: Motorola, Inc., Schaumburg, Ill.
[21] Appl. No.: 666,944
[22] Filed: Mar. 11, 1991
[51] Int. Cl.$^5$ .................. H04B 1/60; H04B 17/02
[52] U.S. Cl. ........................ 455/9; 455/13.1; 455/15; 455/18; 455/54.2; 455/67.1; 455/89; 455/95; 455/226.2
[58] Field of Search .................. 455/9, 11.1, 13.1, 15, 455/18, 54.1, 54.2, 67.1, 89, 95, 226.2

[56] References Cited

U.S. PATENT DOCUMENTS

| | | | |
|---|---|---|---|
| 3,745,462 | 7/1973 | Trimble | 455/11.1 |
| 4,056,779 | 11/1977 | Toler | 455/11.1 |
| 4,056,780 | 11/1977 | Faulkner | 455/18 |
| 4,479,245 | 10/1984 | Batlivala et al. | 455/18 |
| 4,876,710 | 10/1989 | Reed et al. | 379/63 |
| 4,906,989 | 3/1990 | Kasugai | 455/89 |
| 5,010,583 | 4/1991 | Parken | 455/15 |
| 5,056,152 | 10/1991 | Truby et al. | 455/11.1 |

OTHER PUBLICATIONS

Motorola PAC-RT Portable/Mobile Vehicular Repeater System, Theory/Maintenance Manual 68P81010C05-A

*Primary Examiner*—Reinhard J. Eisenzopf
*Assistant Examiner*—Timothy H. Keough
*Attorney, Agent, or Firm*—Michael J. Buchenhorner; Lesley Ann Rhyne

[57] ABSTRACT

A communication system (10) comprises a portable radio (20) and a plurality of mobile repeaters (12), a mobile repeater system 200 comprising a portable signal receiver (224) for receiving portable radio signals; a mobile transmitter (218) for transmitting the portable radio signals received by the portable receiver; a mobile receiver (226) for monitoring mobile transmissions; a delay state counter (202) for delaying the transmission of the portable radio signals received; and a received signal strength indicator (204) for determining the strength of received mobile radio signals, the received signal strength indicator being coupled to the delay state counter, via a controller (206), for decrementing the delay state counter when the mobile receiver does not detect a mobile transmission having at least a predetermined received signal strength level.

6 Claims, 2 Drawing Sheets

MOBILE DETECTOR USING RSSI FOR VEHICULAR REPEATER PRIORITIZATION

TECHNICAL FIELD

This invention relates generally to radio communication systems, and more specifically to radio systems employing a plurality of vehicular repeaters.

BACKGROUND

Vehicular repeater systems are used to extend the range of portable radio units, thus eliminating a potential gap in communications when the user of a vehicular (i.e., mobile) radio is away from the mobile radio unit. A problem arises when a portable radio is within range of more than one mobile repeater because when the portable transmits the mobile repeaters may interfere with each other in repeating the portable's transmission. The Motorola Vehicular Repeater System (VRS) mobile or vehicular repeater solved this problem by operating with a Mobile Detector option, implemented in the mobile radio, employing priority and non-priority repeaters. Each of these repeaters used a delay state counter that was set for a specific delay before repeating commenced. The priority repeater would have the delay state counter set to "delay state zero" so that, the repeater would repeat all signals on the proper carrier frequency. The non-priority repeater would have the delay state counter set to a delay state other than "delay state zero" so that the unit would remain inactive and not repeat until the conditions are present for the unit's delay state counter to decrement down to delay state zero. That insured that each portable transmission was repeated only by the priority repeater in the system, thereby preventing simulcast distortion. The Mobile Detector option also insured that a non-priority repeater would assume the priority state if necessary and repeat the portable transmission if the priority repeater is disabled or leaves the area. However, a problem still exists on how to determine the conditions necessary for decrementing the delay state counter. One approach to this problem is to use the squelch detect circuitry in the mobile radio. However, if squelch detect is used as the deciding factor, the sensitivity of the mobile receiver can cause a problem. A mobile transmitting on the same frequency outside the operating range of the VRS can prevent the non-priority repeater from decrementing its delay state counter, which could result in the portable transmissions not being repeated if the repeater is disabled or leaves the area.

SUMMARY OF THE INVENTION

Briefly, according to the invention, in a communication system comprising a portable radio and a plurality of mobile repeaters, a mobile repeater system comprises:

receiver means for receiving portable radio signals;
transmitter means for transmitting the portable radio signals received by the receiver means;
monitor means for monitoring mobile transmissions;
a delay state counter for delaying the transmission of the portable radio signals received; and
a received signal strength indicator for determining the strength of received mobile radio signals, the received signal strength indicator being coupled to the delay state counter for decrementing the delay state counter when the monitor means does not detect a mobile transmission having at least a predetermined received signal strength level.

DETAILED DESCRIPTION OF THE PREFERRED EMBODIMENT

Figure 1:
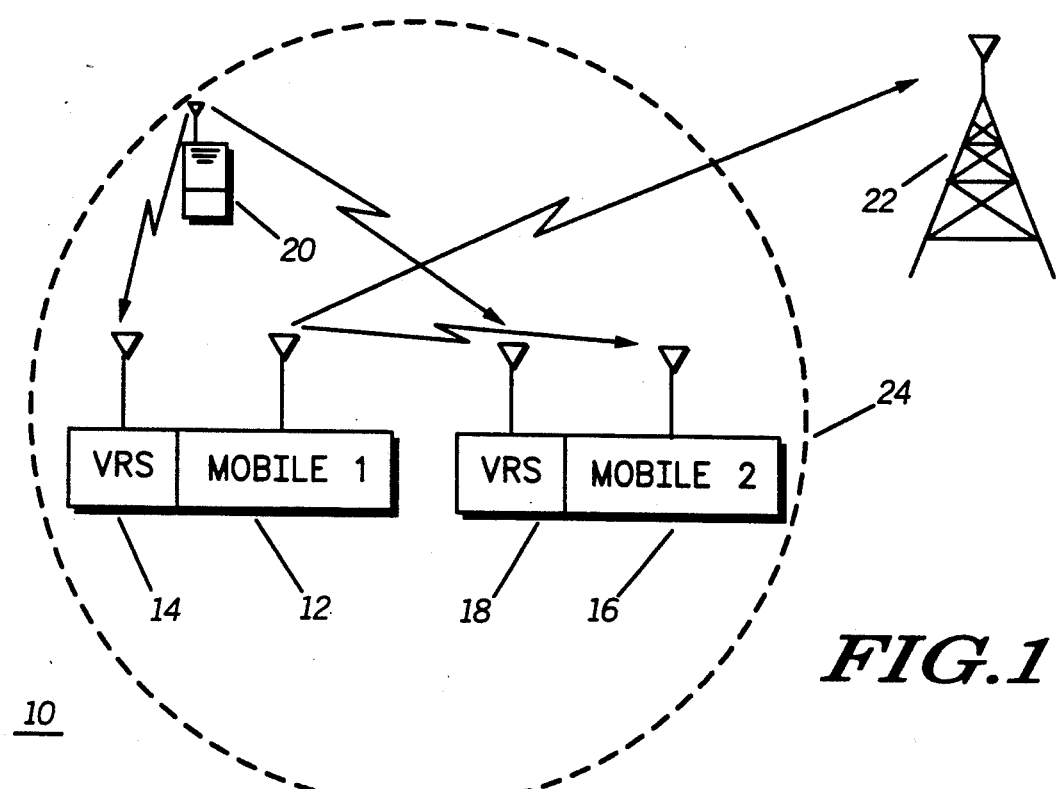
FIG. 1 is a diagram of a communication system in accordance with the invention.

Referring to FIG. 1, a communication system 10 includes a portable radio 20, a first mobile radio 12, having a vehicular repeater system (VRS) 14 connected thereto, a second mobile radio 16, also having a VRS 18 connected thereto, and a base station 22. The portable radio 20 has a range 24. When the mobile unit 12 receives a portable signal and its delay timer is at state zero (i.e., the priority state) it immediately keys its transmitter and repeats the portable's transmission. Mobile unit 16 has its delay timer in a delay state one (i.e., a nonpriority state). Thus, when mobile unit 16 receives the portable signal it monitors the transmit frequency of the mobile unit 12, and when a signal is detected on that frequency, the mobile unit 16 does not decrement its delay state counter, and hence, does not repeat the portable's transmission.

Figure 2:
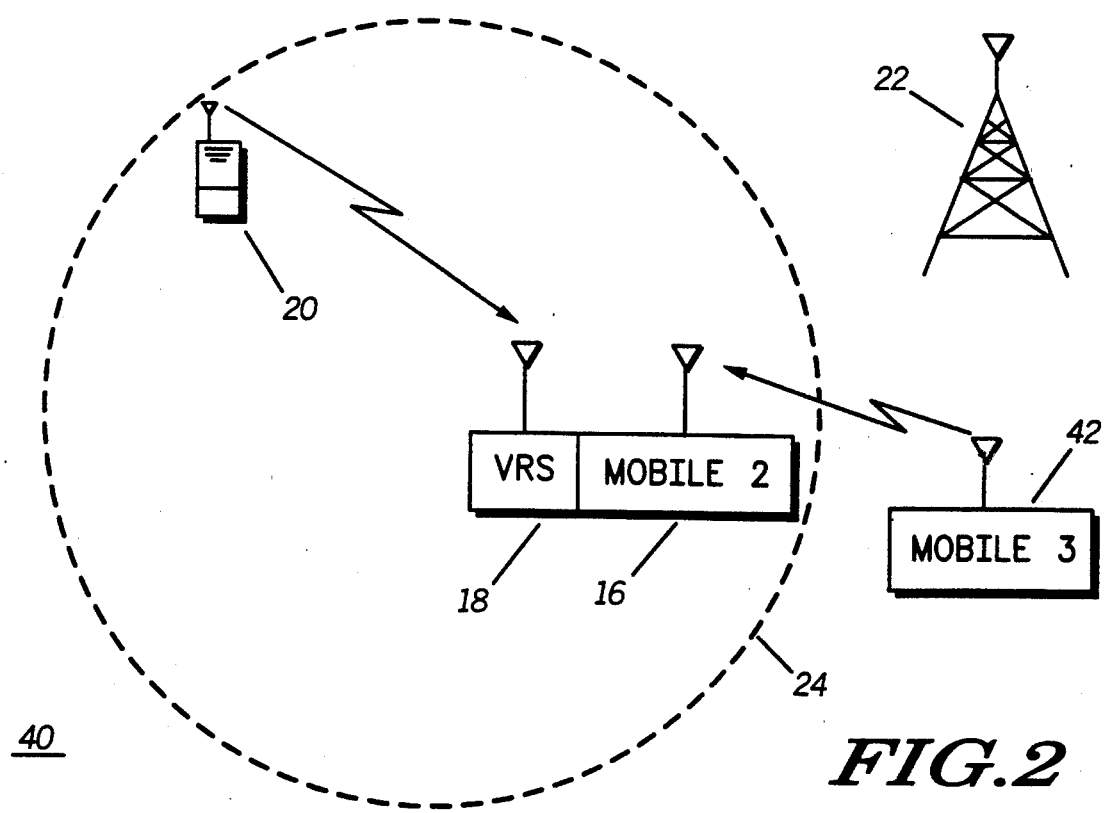
FIG. 2 is a diagram of another communication system in accordance with the invention.

Referring to FIG. 2, when mobile 12 moves outside of the area 24 and mobile 16 receives a portable signal, it monitors the transmit frequency of the mobile 12. When mobile 16 does not detect a signal on that frequency it decrements its delay state counter until it is in the priority state, and then it repeats the portable transmission. However, a problem can arise if a mobile outside the area 24 transmit on the same frequency as mobile unit 12. If squelch detect is used as the deciding factor, the sensitivity of the mobile receiver can cause a problem. A mobile unit 42 transmitting on the same frequency as mobile unit 12 outside the operating range 24 of the portable 20 can prevent the nonpriority repeater 16 from decrementing its delay state counter because as the mobile 16 monitors the transmit frequency of mobile 12 the mobile 16 will not decrement its delay state counter when it detects a signal on that frequency. Therefore, this could result in portable transmissions not being repeated if the priority repeater leaves the area or is disabled.

Figure 3:
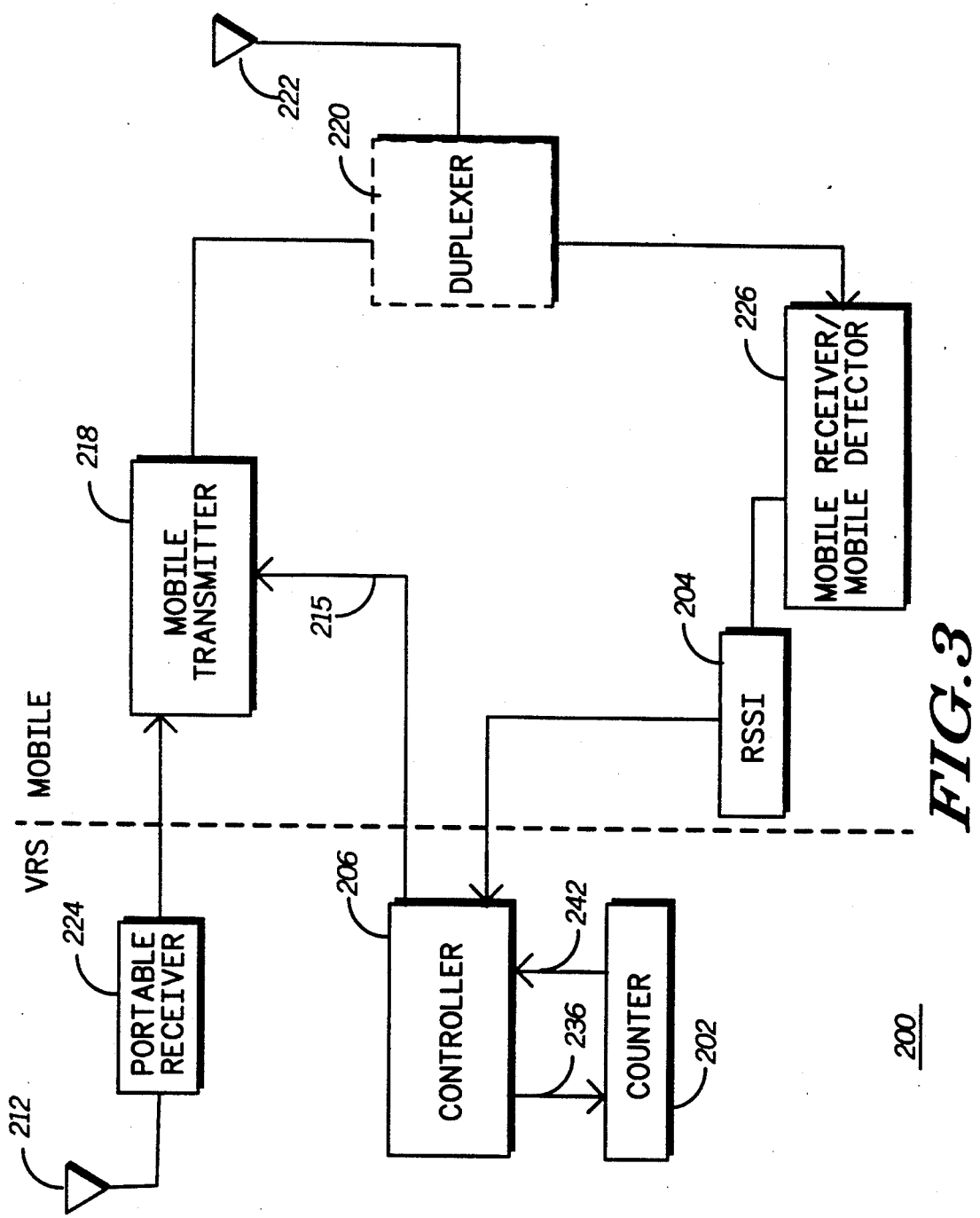
FIG. 3 is a mobile radio/repeater in accordance with the invention.

Referring to FIG. 3, a mobile repeater unit 200 is shown having a Vehicular Repeater System (VRS) Mobile Detector option implemented in the mobile radio (and not in a secondary mobile monitor receiver) in accordance with the invention. The mobile unit comprises a VRS portion and a mobile radio portion. The VRS portion has an antenna 212 and a portable receiver 224 for receiving signals from a portable radio. The VRS portion also includes a controller 206 (e.g., a conventional microprocessor), for controlling the operation of the VRS, and a delay state counter 202 coupled to the controller 206 via connections 236 and 242. The mobile radio includes a mobile transmitter 218, for transmitting the portable signals to a base station, a mobile receiver/mobile detector 226, and a Received Signal Strength Indicator (RSSI) 204, to be used in the mobile radio 200 instead of a squelch detect as the deciding factor in determining whether to decrement the delay state counter 202. A duplexer 220 is coupled to an antenna 22 to allow two-way duplex communication. By using RSSI and programming the required RSSI value, the user can selectively limit the operating range of the localized system. Only mobile signals with the required RSSI value (i.e., those mobiles in the VRS operating range) can prevent the nonpriority repeater(s) from decrementing its delay state counter. Thus eliminating the problem of the mobile receiver sensitivity.

Mobile Radio Service Software (RSS) enables/disables the VRS Mobile Detector 226. It also allows the user to enter the desired coverage area in distance (e.g., ¼ mile, ½ mile) from the mobile unit which is automatically translated to an RSSI value. The RSS automatically copies each user mode's transmit frequency into a corresponding "ghost" mode's receive frequency. These ghost modes are transparent to the user and cannot be selected via a control head. The only requirement for this feature is that the mobile EEPROM (electrically erasable programmable read-only memory) have the capability of twice the number of programmed user modes.

When the conditions exist for repeating a portable transmission, the non-priority repeaters "steer" the mobile receiver 226 to the transmit frequency of the priority repeater. If the mobile detects carrier on that frequency with an RSSI value equal to or greater than the programmed value within one delay state time, it is assumed the system's priority vehicular repeater is repeating the portable transmission and the nonpriority repeaters do nothing. If the mobile does not detect carrier with an RSSI value equal to or greater than the programmed value within one delay state time then the non-priority repeaters decrement their delay state counters. This continues until a non-priority repeater decrements its delay state counter to zero (the priority repeater state) and repeats the portable transmission.

What is claimed is:

1. In a communication system comprising a portable radio, a plurality of mobile radios and at least one mobile radio having a vehicular repeater, a vehicular repeater prioritization system comprising:
   receiver means for receiving portable radio signals;
   transmitter means for transmitting the portable radio signals received by the receiver means;
   monitor means for monitoring transmitted mobile radio signals;
   a delay state counter coupled to the transmitter means for delaying the transmission of the portable radio signals received when said delay state counter is greater than a desired priority state and not delaying the transmission of the portable radio signals received when said delay state counter is equal to said desired priority state; and
   a received signal strength indicator for determining the strength of transmitted mobile radio signals, the received signal strength indicator being coupled to the delay state counter for decrementing the delay state counter when the monitor means does not detect a transmitted mobile radio signal having at least a predetermined received signal strength level.

2. A communication system comprising:
   a vehicular repeater comprising:
      a portable signal receiver for receiving signals from portable radio units;
      a controller coupled to a mobile transmitter;
      a delay state counter coupled to the controller, for delaying the transmission of radio signals received by the portable signal receiver when said delay state counter is greater than a desired priority state and not delaying the transmission of the portable radio signals received when said delay state counter is equal to said desired priority state;
   a mobile radio comprising:
      a mobile receiver for monitoring transmissions by other mobile radios;
      said mobile transmitter coupled to the portable signal receiver for transmitting the signals received by the portable signal receiver; and
      a received signal strength indicator, coupled to the controller and to the mobile receiver, for determining the strength of the transmissions by other mobile radios, the received signal strength indicator being coupled to the controller for decrementing the delay state counter when the mobile receiver does not detect a mobile transmission having at least a predetermined received signal strength level.

3. The communication system of claim 2 further comprising:
   a first antenna coupled to the portable signal receiver.

4. The communication system of claim 2 further comprising:
   a duplexer coupled to the mobile transmitter and to the mobile receiver.

5. The communication system of claim 4 further comprising:
   an antenna coupled to the duplexer.

6. In a communication system comprising a plurality of priority and non-priority repeaters, at least one portable radio, and a plurality of mobile radios, a method for prioritizing a non-priority repeater, comprising the steps of:
   (a) receiving portable radio signals in said non-priority repeater;
   (b) monitoring a delay state counter of said non-priority repeater and if said delay state counter is greater than a desired priority state, delaying the transmission of portable radio signals received;
   (c) determining the strength of transmitted mobile radio signals;
   (d) decrementing said delay state counter when said mobile radio signal having at least a predetermined received signal strength level is not detected until a priority state is reached; and
   (e) transmitting the radio signals received in step (a) if said delay state counter is equal to a desired priority state.

* * * * *